(12) United States Patent
Lupe et al.

(10) Patent No.: US 9,366,313 B2
(45) Date of Patent: Jun. 14, 2016

(54) TORSIONAL RESONANCE FREQUENCY ADJUSTOR

(71) Applicant: General Electric Company, Schenectady, NY (US)

(72) Inventors: Douglas Arthur Lupe, Ballston Spa, NY (US); William Edward Adis, Scotia, NY (US); Robert Edward Deallenbach, Flat Rock, NC (US); Mehmet Muhittin Dede, Cobleskill, NY (US); Andrzej Korabik, Wroclaw (PL); Noah Matthew Rothe, Charlton, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/240,761

(22) PCT Filed: Mar. 15, 2013

(86) PCT No.: PCT/PL2013/000035
§ 371 (c)(1),
(2) Date: Feb. 25, 2014

(87) PCT Pub. No.: WO2014/142684
PCT Pub. Date: Sep. 18, 2014

(65) Prior Publication Data
US 2016/0010721 A1    Jan. 14, 2016

(51) Int. Cl.
*F16F 15/315* (2006.01)
*F16F 15/34* (2006.01)
(Continued)

(52) U.S. Cl.
CPC ............ *F16F 15/3153* (2013.01); *F16F 15/30* (2013.01); *F16F 15/322* (2013.01); *F16F 15/34* (2013.01)

(58) Field of Classification Search
CPC ..... F16F 15/30; F16F 15/3153; F16F 15/322; F16F 15/34; Y10T 74/2121
See application file for complete search history.

(56) References Cited

U.S. PATENT DOCUMENTS

| 59,032 | A | * | 10/1866 | Jucket | F16H 55/17 464/182 |
| 477,324 | A | * | 6/1892 | Coburn | F16F 15/30 474/184 |

(Continued)

FOREIGN PATENT DOCUMENTS

| DE | 894922 C | 10/1953 |
| DE | 202009002305 U1 | 4/2009 |

(Continued)

OTHER PUBLICATIONS

Office Action for U.S. Appl. No. 13/832,159, dated Mar. 18, 2015, 16 pages.

(Continued)

*Primary Examiner* — Adam D Rogers
(74) *Attorney, Agent, or Firm* — Ernest G. Cusick; Hoffman Warnick LLC (57) ABSTRACT

Engaging inclined surfaces of an inner ring and an outer ring create wedge action inducing an inward radial force as the rings are forced together longitudinally, holding the adjustor on a rotating body. An inner total arcuate length of each ring is smaller than an outer total arcuate length of a respective target body (inner ring for outer ring, rotating body for inner ring). Arcuate segments of each ring can have inner surfaces with radii of curvature equal to or smaller than that of the target body outer surface, and with a total arcuate length smaller than the circumference of the target body's outer surface.

15 Claims, 10 Drawing Sheets

(51) Int. Cl.
*F16F 15/32* (2006.01)
*F16F 15/30* (2006.01)

(56) References Cited

U.S. PATENT DOCUMENTS

| | | | |
|---|---|---|---|
| 804,806 A * | 11/1905 | Gerlach | F16F 15/30 |
| | | | 74/572.21 |
| 861,463 A | 7/1907 | Hyde | |
| 1,272,061 A | 7/1918 | Lake | |
| 1,497,735 A | 6/1924 | Richardson | |
| 1,645,268 A | 10/1927 | Walker | |
| 1,645,343 A * | 10/1927 | Moorhouse | F16F 15/34 |
| | | | 464/180 |
| 1,734,267 A | 11/1929 | Moorhouse | |
| 2,348,941 A | 5/1944 | Ware | |
| 2,499,618 A | 3/1950 | Wolfe | |
| 3,528,316 A * | 9/1970 | Hammer | F16F 15/322 |
| | | | 464/180 |
| 3,884,093 A * | 5/1975 | Rabenhorst | F16C 15/00 |
| | | | 416/60 |
| 4,102,220 A | 7/1978 | Brobeck | |
| 4,112,785 A | 9/1978 | Brobeck | |
| 4,721,445 A | 1/1988 | Hoffmann | |
| 4,821,860 A | 4/1989 | Crawford et al. | |
| 5,263,995 A | 11/1993 | Mogilnicki et al. | |
| 5,478,421 A | 12/1995 | Medney et al. | |
| 5,637,938 A | 6/1997 | Vukorpa et al. | |
| 5,810,527 A | 9/1998 | Jager et al. | |
| 5,931,050 A | 8/1999 | Roach | |
| 6,135,684 A | 10/2000 | Senzaki | |
| 6,186,712 B1 | 2/2001 | Senzaki | |
| 6,322,299 B1 | 11/2001 | Hartman | |
| 6,356,409 B1 | 3/2002 | Price et al. | |
| 6,794,773 B2 | 9/2004 | Jordan et al. | |
| 6,883,487 B2 | 4/2005 | Lehmann et al. | |
| 7,104,133 B2 | 9/2006 | Kuroda et al. | |
| 7,308,840 B2 | 12/2007 | Alvarez et al. | |
| 7,753,166 B2 | 7/2010 | Brockman et al. | |
| 8,013,481 B2 | 9/2011 | Sommerlatte et al. | |
| 8,146,457 B2 * | 4/2012 | Wright | F16F 15/145 |
| | | | 74/572.2 |
| 8,732,927 B2 | 5/2014 | Graham et al. | |
| 9,079,253 B2 | 7/2015 | Bierl et al. | |
| 2003/0010594 A1 | 1/2003 | Howell et al. | |
| 2006/0272446 A1 | 12/2006 | Cortright et al. | |
| 2007/0090723 A1 | 4/2007 | Keolian et al. | |
| 2007/0188026 A1 * | 8/2007 | Bi | H02K 1/30 |
| | | | 310/51 |
| 2008/0088200 A1 | 4/2008 | Ritchey | |
| 2012/0111689 A1 | 5/2012 | Atkins et al. | |
| 2012/0227536 A1 * | 9/2012 | Jewett | F16F 15/3153 |
| | | | 74/572.2 |
| 2014/0260781 A1 * | 9/2014 | Dede | F16F 15/315 |
| | | | 74/572.21 |
| 2015/0097459 A1 | 4/2015 | Kalev et al. | |

FOREIGN PATENT DOCUMENTS

| | | | |
|---|---|---|---|
| EP | 0358167 | A2 | 3/1990 |
| EP | 0372724 | A2 | 6/1990 |
| EP | 0465696 | A1 | 1/1992 |
| EP | 0646435 | A1 | 4/1995 |
| EP | 2034213 | A1 | 3/2009 |
| GB | 3524 | | 0/1909 |

OTHER PUBLICATIONS

Final Office Action for U.S. Appl. No. 13/832,159, dated Jul. 23, 2015, 151 pages.
International Search Report and Written Opinion for PCT/PL2013/000035, mailed Nov. 26, 2013, 12 pages.
Office Action for U.S. Appl. No. 13/832,159, dated Dec. 11, 2016, 9 pages.
Notice of Allowance for U.S. Appl. No. 13/832,159, dated Feb. 9, 2016, 6 pages.
Office Action for U.S. Appl. No. 13/832,159, dated Apr. 20, 2016, 8 pages.

* cited by examiner

TORSIONAL RESONANCE FREQUENCY ADJUSTOR

BACKGROUND OF THE INVENTION

The disclosure relates generally to adjustment of a torsional resonance frequency of a rotating body, such as a gas or steam turbine rotor, and more particularly to adjustment of a moment of inertia and/or mass of such a rotating body to tune or adjust such a torsional resonance frequency.

In the operation of rotating machinery, particularly in the operation of power generation turbines, it is sometimes desirable to change a torsional resonance frequency of one or more rotating elements of the machinery to avoid excessive vibration and/or damage and/or failure of the machinery during operation. Current solutions for doing so typically add mass to a rotor or the like by adding a mass ring. However, the process involves removing the rotor from its half shell or casing so that the mass ring can be heated, placed on a desired mounting location on the rotor, and cooled to form a shrink fit of the mass ring on the rotor. The removal of the rotor from the half shell adds time and complexity to the process, as does the shrink fit process. Removing the rotor also involves disassembly of one or more couplings, further adding to the complexity and time involved.

BRIEF DESCRIPTION OF THE INVENTION

Embodiments of the invention disclosed herein may take the form of a torsional frequency adjustor for a rotating body, the torsional frequency adjuster having a first ring and a second ring. The first ring can have a first engagement surface parallel to an outer surface of the rotating body, the first surface having a total arcuate length smaller than a circumference of the outer surface of the rotating body. The first ring can further have a first wedge surface inclined at a first angle with respect to the first surface. The second ring can have a second wedge surface corresponding to and selectively engaging the first wedge surface, a total arcuate length of the second wedge surface being smaller than the total arcuate length of the first wedge surface at each corresponding point along a shared longitudinal axis of the first and second rings. The adjustor can include an inducer that selectively draws the first wedge surface into engagement with the second wedge surface, thereby inducing an interference fit of the first engagement surface with the outer surface of the rotating body.

Embodiments of the invention may also take the form of a torsional frequency adjustor for a rotating body, the torsional frequency adjuster having a first ring including a first plurality of arcuate segments with a first inner total arcuate length that is smaller than an outer circumference of the rotating body. In addition, the adjustor can include a second ring having a second plurality of arcuate segments with a second inner total arcuate length that is smaller than an outer total arcuate length of the first ring. An inducer of the adjustor can be attached to at least one of the first ring or the second ring so as to induce radial inward force on the first ring, thereby forcing the inner ring into engagement with the rotating body.

Another embodiment may include a torsional frequency adjustor for a rotating body, the torsional frequency adjuster including an inner ring with an inner total arcuate length smaller than an outer total arcuate length of the rotating body. The inner ring can have a longitudinal center with a largest outer diameter of the inner ring, a front portion extending from a longitudinal front edge to the longitudinal center, and a rear portion of the inner ring extending from the longitudinal center to a rear longitudinal edge. The longitudinal front edge can have an outer diameter that is smaller than the largest outer diameter, as can the longitudinal rear edge. The adjustor may additionally include at least two front outer rings sized to engage an outer surface of the front portion of the inner ring and at least two rear outer rings sized to engage an outer surface of the rear portion of the inner ring. Each front outer ring can include an inner surface corresponding to at least a part of the outer surface of the front portion of the inner ring so that when the at least two front outer rings are engaging each other in a longitudinal direction, the combined inner surfaces of the at least two front outer rings form a substantially contiguous inner surface selectively engaging the outer surface of the front portion of the inner ring. Similarly, each rear outer ring can include an inner surface corresponding to at least a part of the outer surface of the rear portion of the inner ring so that when the at least two rear outer rings are engaging each other, the combined inner surfaces of the at least two rear outer rings form a substantially contiguous inner surface selectively engaging the outer surface of the rear portion of the inner ring. An inducer of the adjustor can selectively draw the at least two front outer rings and the at least two rear outer rings together in a longitudinal direction, thereby drawing the inner surfaces of the outer rings into engagement with the outer surfaces of the inner ring to induce an inward radial force in the inner ring that, responsive to the adjustor being mounted on the rotating body, effects an interference fit between the inner ring and the rotating body.

Other aspects of the invention provide methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

The detailed description explains embodiments of the invention, together with advantages and features, by way of example with reference to the drawings.

DETAILED DESCRIPTION OF THE INVENTION

Aspects of the invention provide a way to add mass to a rotating body, such as a rotor, to change a torsional resonance frequency of the rotor or a respective rotor train without removal of the rotor from its casing or half shell and without removal of coupling bolts. Broadly, a wedge ring may be squeezed onto the rotor by two or more mass or outer or bolt rings, though multiple wedge rings can be used. By segmenting the wedge ring and/or mass rings so that each includes at least two pieces, an interference fit may be produced by pulling the mass rings together about the wedge ring. A particularly advantageous configuration includes circumferentially staggering gaps between bolt ring segments to reduce stress on the mass rings and/or wedge rings and the assembly overall. As the mass rings are drawn together over the wedge ring on a rotor or the like, an inward radial force is created by wedge action that squeezes the wedge onto the rotor, creating an interference fit. The interference fit maintains the position of the torsional frequency adjustor on the rotor, preventing it from moving axially or circumferentially, as well as maintaining contact through overspeed conditions that would be expected, such as in an over speed balance procedure performed on the rotor.

Figure 1:
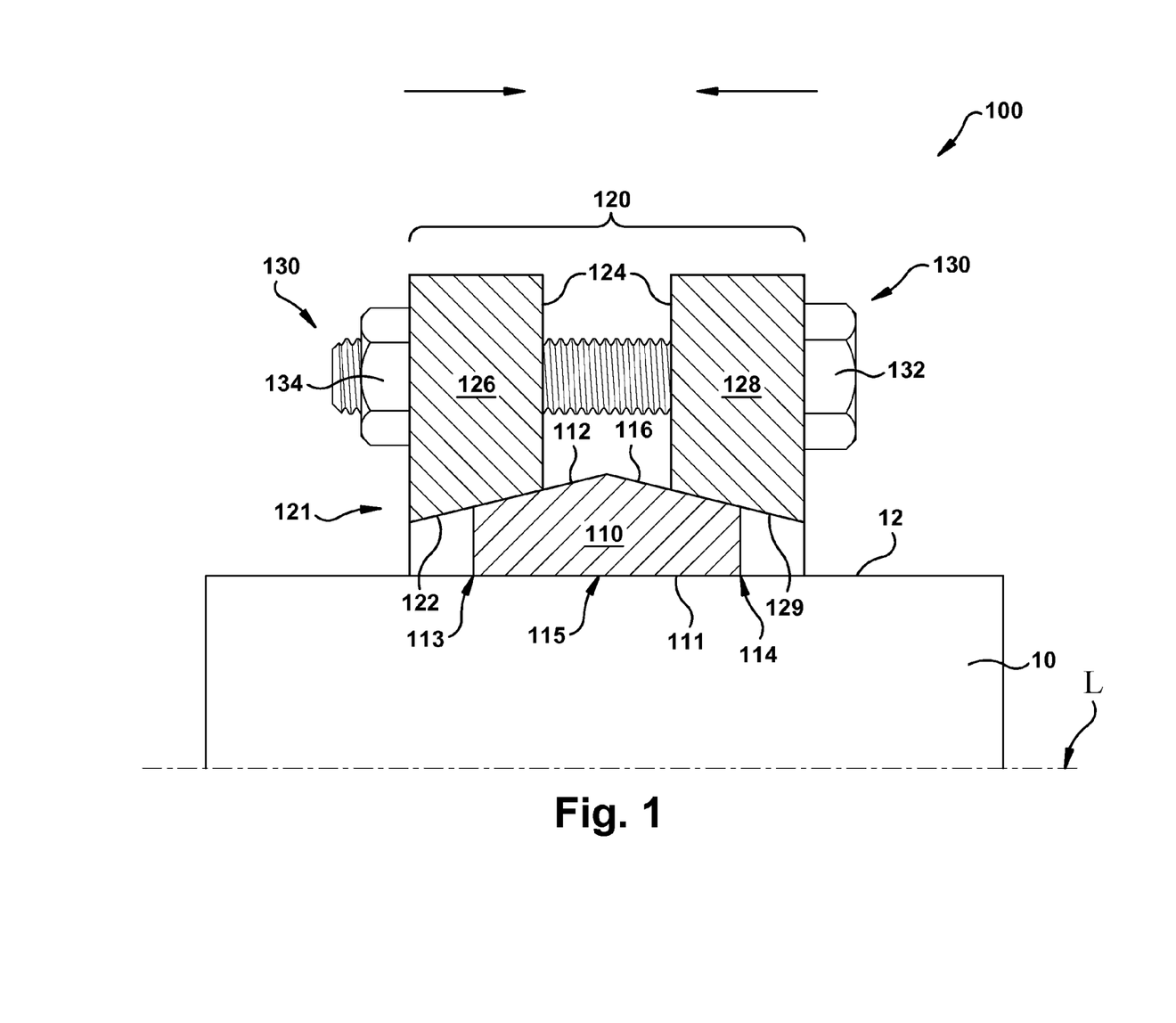
FIG. 1 shows a schematic cross sectional diagram of an unassembled torsional frequency adjustor according to embodiments of the invention disclosed herein.
Figure 2:
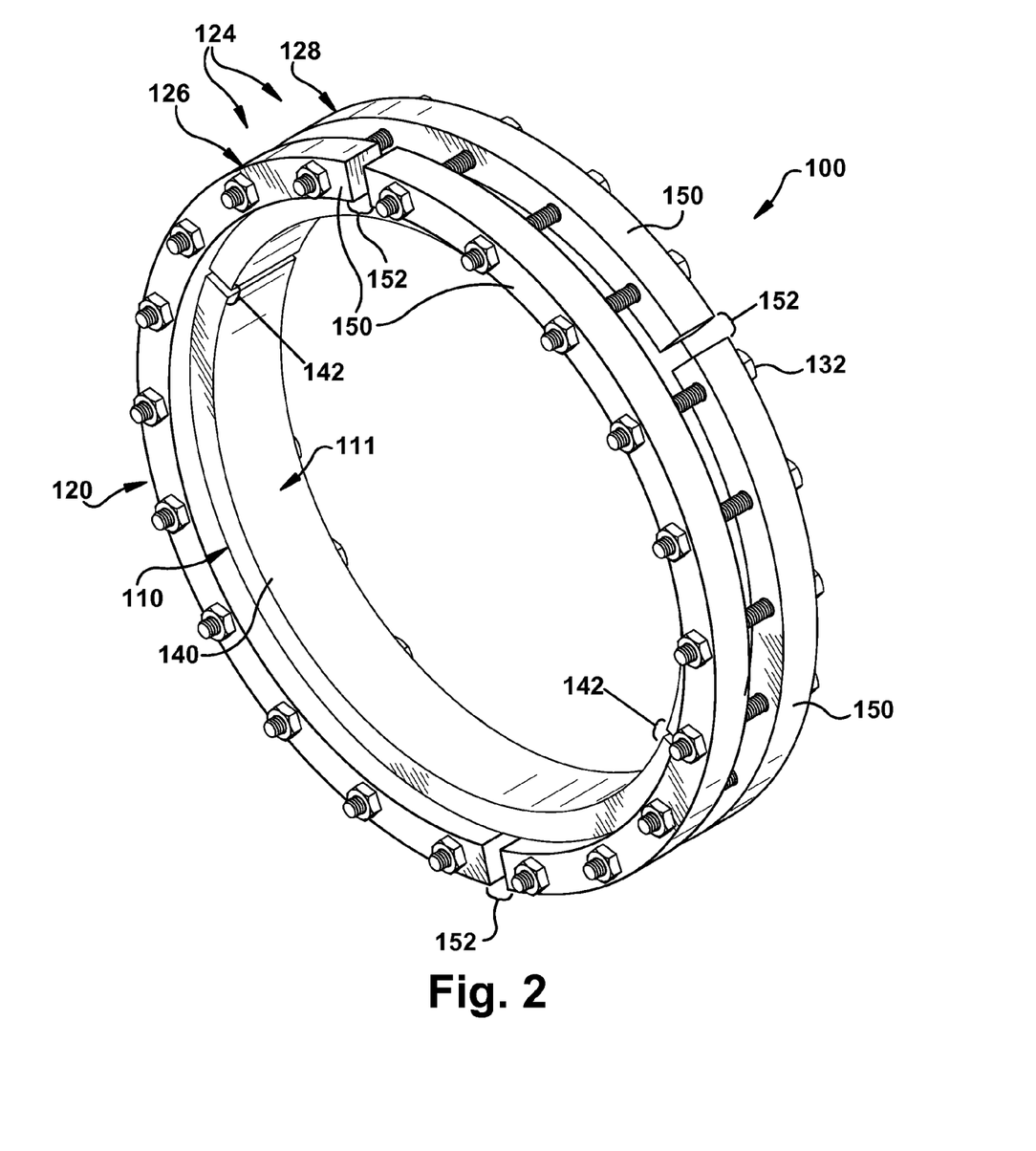
FIG. 2 shows a schematic perspective diagram of the unassembled torsional frequency adjustor seen in FIG. 1 according to embodiments of the invention disclosed herein.
Figure 3:
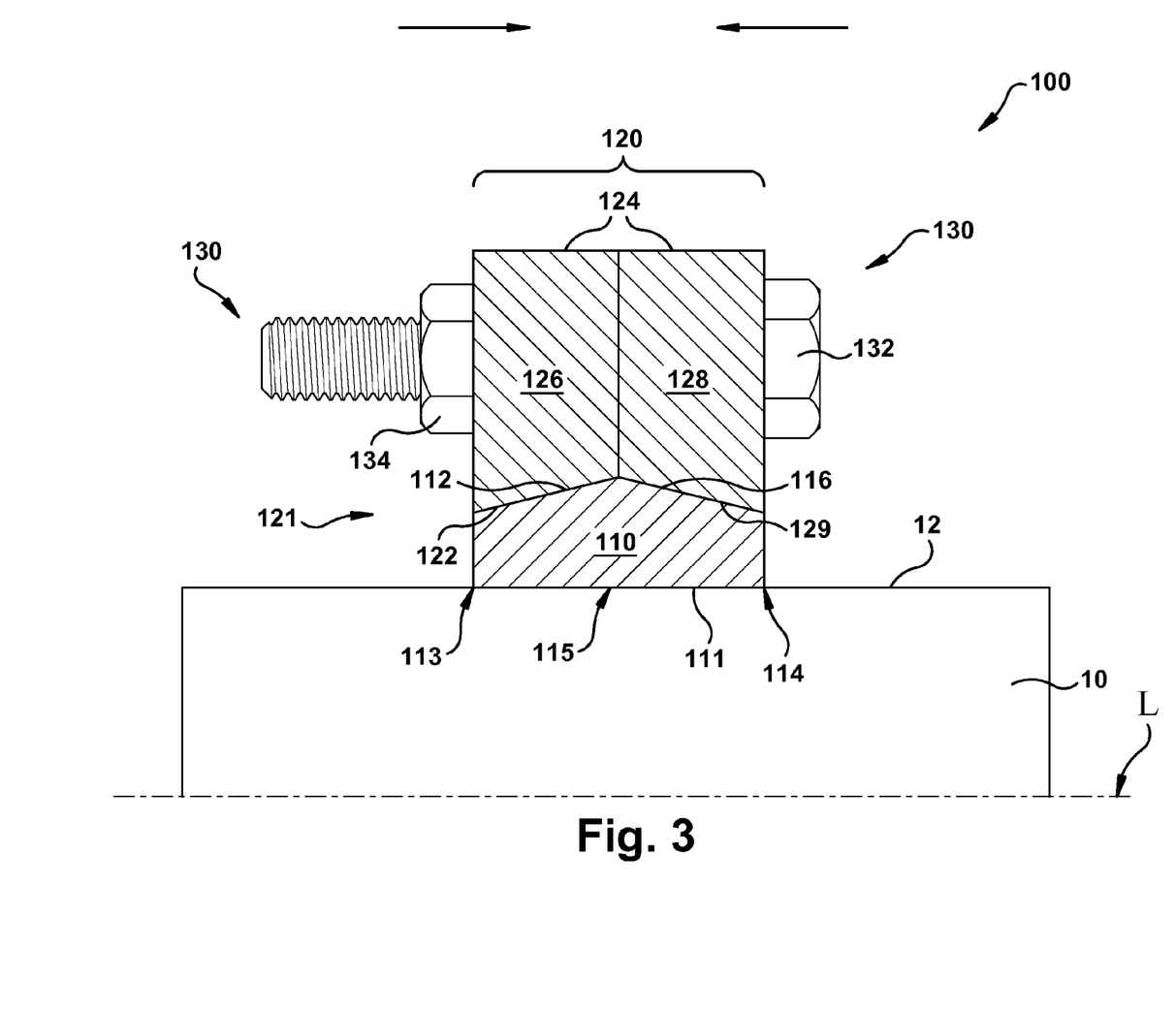
FIG. 3 shows a schematic cross sectional diagram of the torsional frequency adjustor of FIGS. 1 and 2 assembled according to embodiments of the invention disclosed herein.

With reference to FIGS. 1-4, noting that some elements are only visible in the cross sectional views of FIGS. 1 and 3, an example of a torsional frequency adjustor 100 for a rotating body 10 can include a first ring 110, which can be construed as an inner ring or a wedge ring in embodiments. First ring 110 can have a first engagement surface 111, such as a cylindrical inner surface, parallel to an outer surface 12 of the rotating body 10. First engagement surface 111 can have an inner total arcuate length that is smaller than a circumference of outer surface 12 of rotating body 10. A first wedge surface 112 inclined at a first angle with respect to first engagement surface 111 can extend from a left or front longitudinal edge 113 of first ring 110 toward a right or rear longitudinal edge 114 of first ring 110. A second ring 120, which, depending on a particular implementation, can be an outer ring, a retainer ring, a bolt ring, and/or a mass ring, can have an inner extremity 121 including a second wedge surface 122 corresponding to first wedge surface 112. An inner total arcuate length of second wedge surface 122 is smaller than the total arcuate length of the first wedge surface 112 at each corresponding point along a shared longitudinal axis of first and second rings 110, 120. An inducer 130 can selectively draw first wedge surface 112 and second wedge surface 122 together, thereby inducing an interference fit or wedge action that induces an inward radial force. When adjustor 100 is mounted on rotating body 10, the inward radial force holds adjustor 100 in place on rotating body 10.

As particularly seen in FIGS. 1 and 3, first wedge surface 112 of first ring 110 can stop at a longitudinal center 115 of first ring 110 and can adjoin a third wedge surface 116 extending from longitudinal center 115 to right or rear longitudinal edge 114 of first ring 110. First ring 110 in embodiments has a largest outer diameter at longitudinal center 115, while left and right longitudinal edges 113, 114 each have a respective outer diameter smaller than that of longitudinal center 115. While left and right longitudinal edges 113, 114 are shown as having equal outer diameters in FIGS. 1-4, different outer diameters can be employed as desired and/or appropriate.

Figure 5:
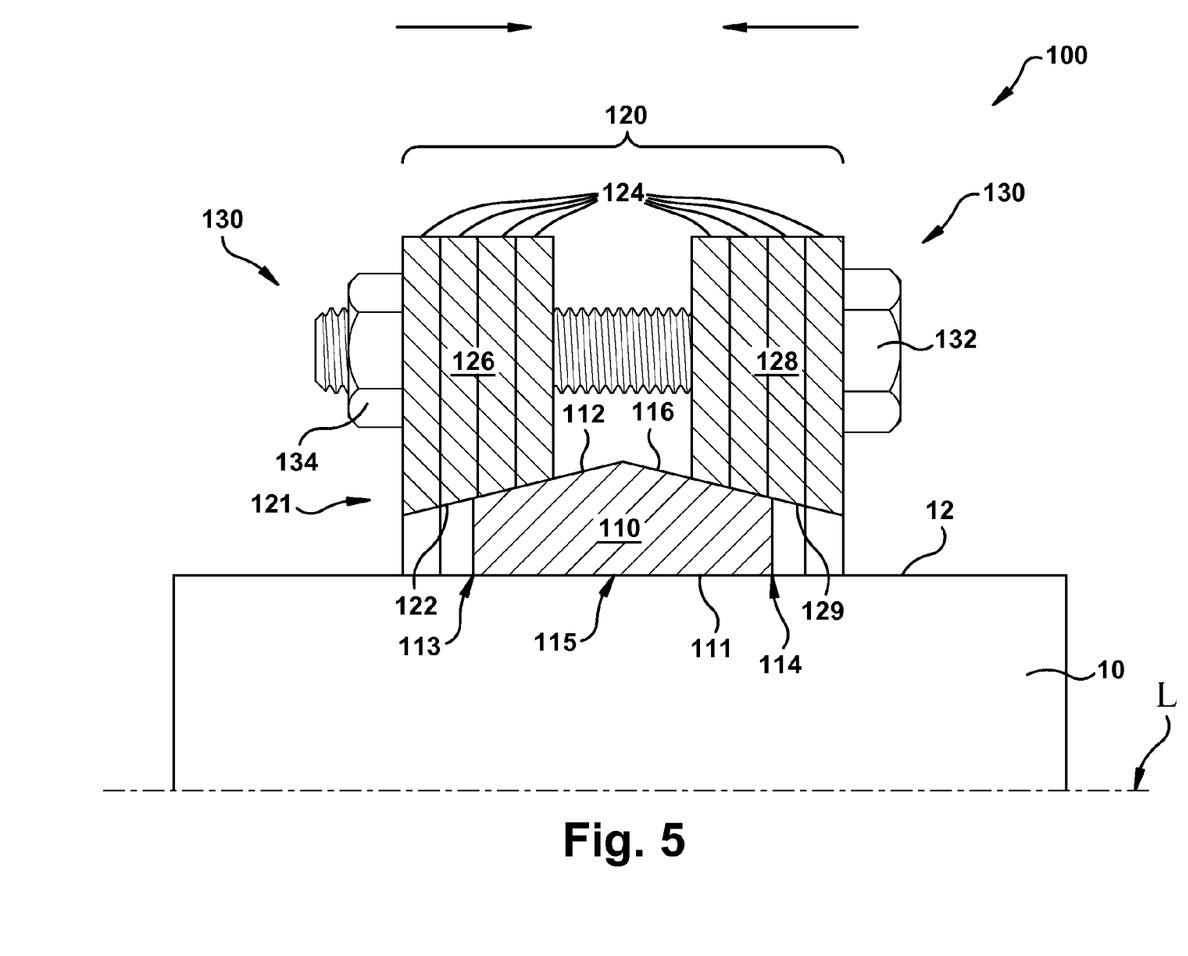
FIG. 5 shows a schematic cross sectional diagram of an unassembled torsional frequency adjustor according to embodiments of the invention disclosed herein.
Figure 6:
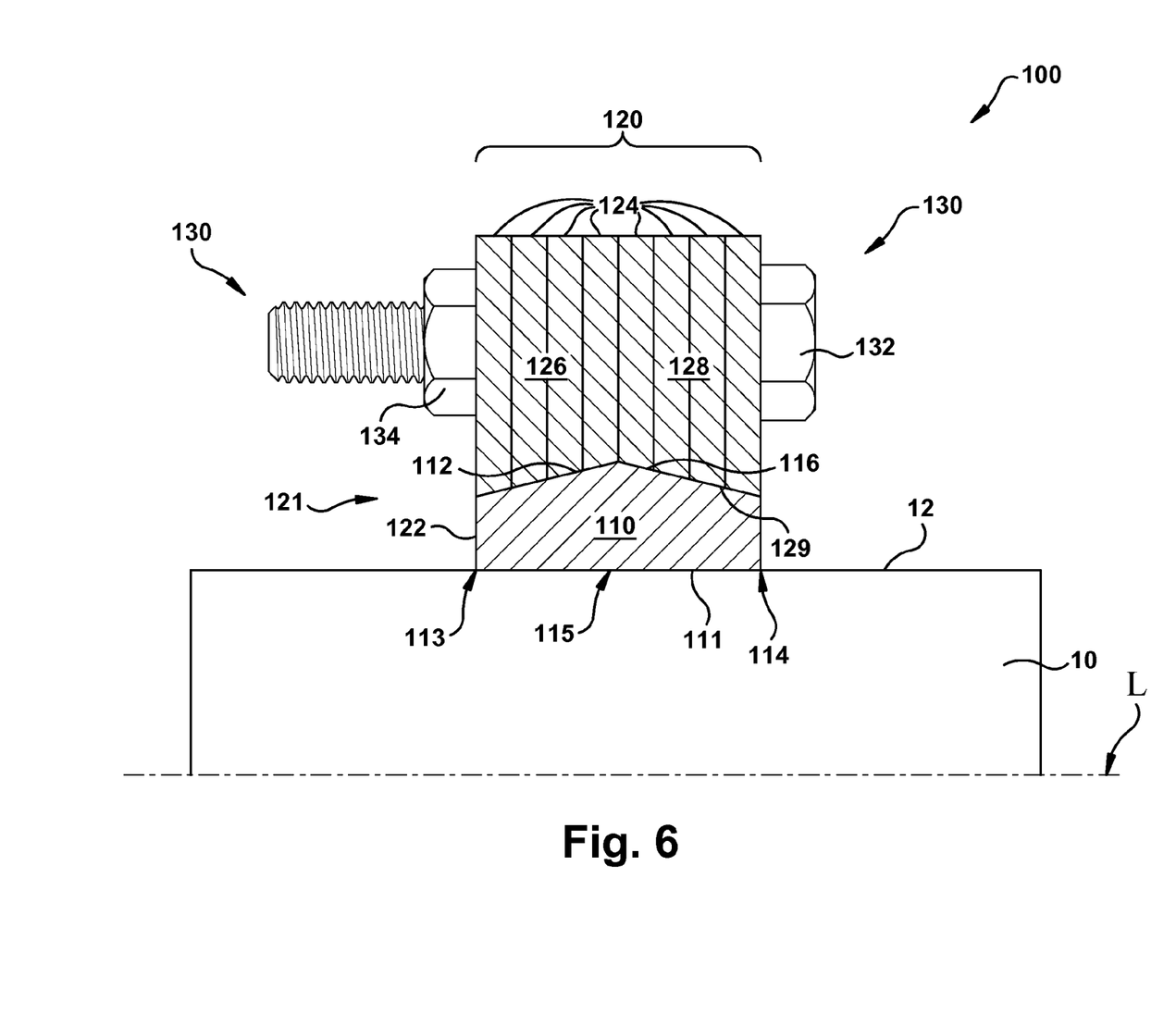
FIG. 6 shows a schematic cross sectional diagram of the assembled torsional frequency adjustor of FIG. 5 according to embodiments of the invention disclosed herein.
Figure 7:
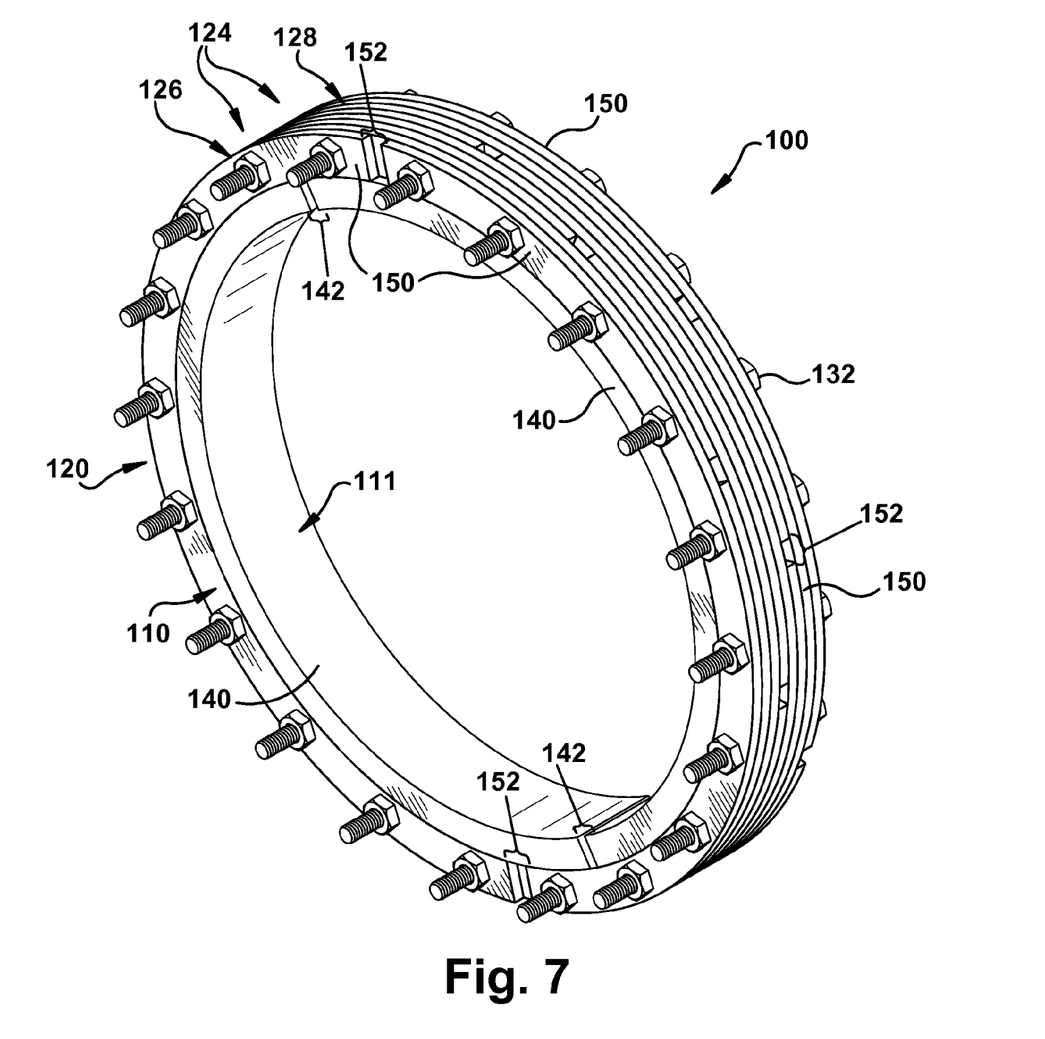
FIG. 7 shows a schematic perspective diagram of the torsional frequency adjustor of FIGS. 5 and 6 according to embodiments of the invention disclosed herein.

As also seen in FIGS. 1-4, particularly in FIGS. 1 and 3, second ring 120 can be a compound ring including a plurality of component rings or subrings 124. For example, one or more left or front subrings 126 can be employed, second wedge surface 122 including inner surfaces of each left or front subring 126. In addition, one or more right or rear subrings 128 can be employed, inner surfaces of which can form a fourth wedge surface 129 that corresponds to third wedge surface 116. While the example of FIGS. 1-4 shows one left or front subring and one right or rear subring, multiple such subrings can be used as seen in FIGS. 5-7. When multiple subrings 124 are employed on each side or end of the adjustor, inner surfaces of the subrings of a given side or end or portion of the adjustor can form a substantially contiguous surface that can include a respective wedge surface. For example, where multiple left or front subrings 126 are used, their combined inner surfaces can form a substantially contiguous surface that can include second wedge surface 122. Similarly, where multiple right or rear subrings 128 are used, their combined inner surfaces can form a contiguous surface that can include fourth wedge surface 129.

Inducer 130, as seen in both examples of FIGS. 1-7, can include fasteners arranged to draw left or front subring(s) 126 and right or rear subring(s) 128 together. For example, fasteners can be attached to an outermost subring on each side, though in embodiments a plurality of circumferentially spaced bolts 132 can be inserted through the subrings and nuts 134 can be used to draw subrings 124 together. It should be noted that other fasteners can be used as may be desired and/or appropriate. Where bolts 132 and nuts 134 are used as fasteners, the subrings are drawn together as nuts 134 are tightened, but are restrained against outward radial movement in part by bolts 132 as second and fourth wedge surfaces 122, 129 more and more fully engage first and third wedge surfaces 112, 116, resulting in wedge action. Since first ring 110 is restrained against inward radial movement by rotating body 10, the wedge action induces an interference fit and/or an inward radial force that can hold adjustor 100 in place on rotating body 10.

Figure 4:
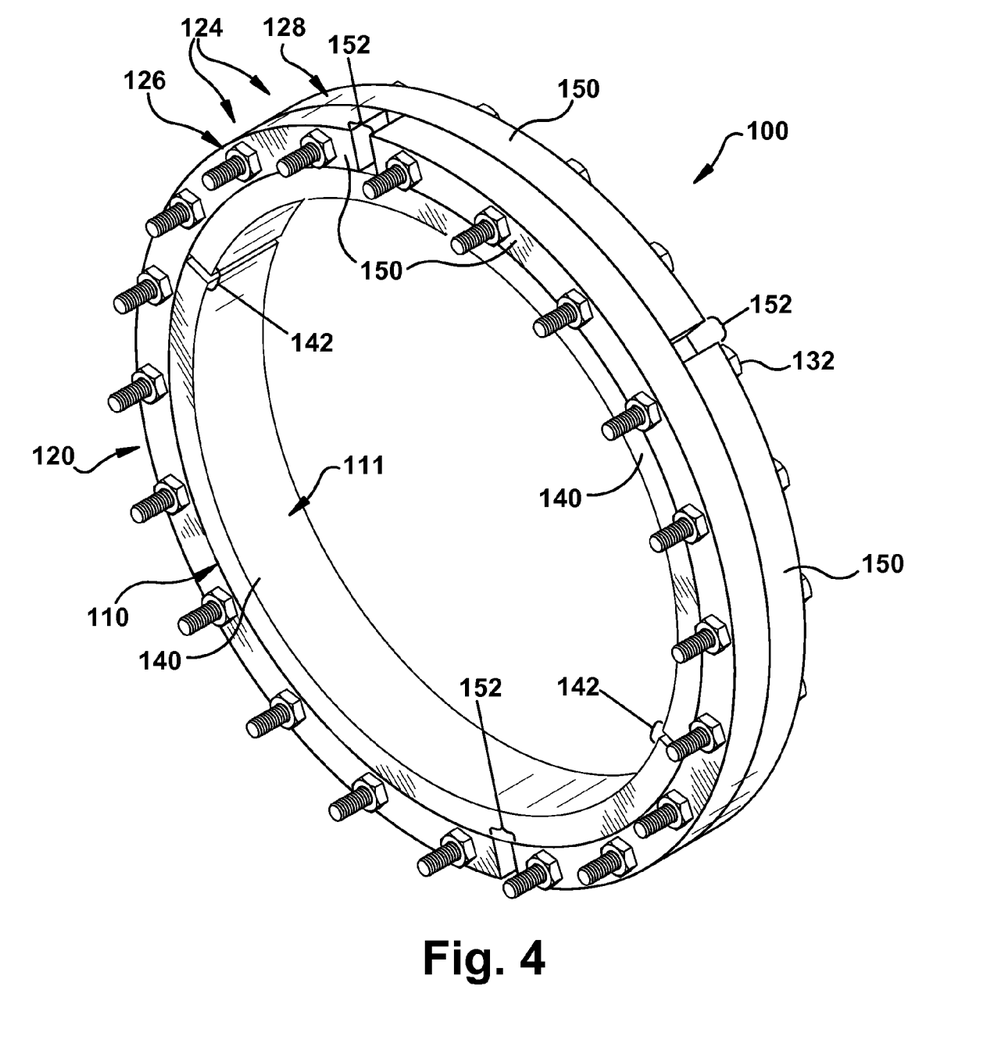
FIG. 4 shows a schematic perspective diagram of the assembled torsional frequency adjustor of FIG. 3 according to embodiments of the invention disclosed herein.

As can also be seen in FIGS. 2, 4, and 7, each of first ring 110 and second ring 120, including subrings 124, can be segmented, which can allow mounting of adjustor 100 on rotating body 10 without removing rotating body from any housing or the like (not shown) that might otherwise impede mounting of a conventional adjustor. For example, as seen in FIGS. 2, 4, and 7, first ring 110 can include a plurality of first arcuate segments 140 selectively mounted on rotating body 10, and second ring 120 can include a plurality of second arcuate segments 150 selectively mounted on first ring 110. For each segmented ring and/or segmented subring, the total arcuate length of the inner surfaces of a ring's segments is less than a circumference of the surface the respective segmented ring is to engage to assist with formation of an interference fit between the segmented ring and the surface it is to engage. In addition, the inner surfaces of the arcuate segments can have the same radius of curvature as the surfaces they are to engage, though in embodiments, the arcuate segments can have a smaller radius of curvature to enhance the interference fit.

With regard to first ring 110, engagement surface 111 in embodiments can include the combined inner surfaces of first arcuate segments 140, and any total arcuate length of first ring 110 can include a total of respective arcuate lengths of first arcuate segments 140. Each first arcuate segment 140 can have a radius of curvature of its inner surface substantially equal to that of an outer surface of rotating body 10, but first arcuate segments 140 can be sized so that their inner total arcuate length is smaller than the outer circumference of rotating body 10. In the examples seen in FIGS. 2, 4, and 7, first ring 110 includes two first arcuate segments which can be mounted opposite each other around rotating body 10, leaving diametrically opposed gaps 142 between the segments. While two gaps 142 are shown, it should be clear that the arcuate segments could be mounted so as to abut, leaving one gap 142 diametrically opposite the point of engagement between the segments. In addition, where more than two first arcuate segments 140 are used, multiple gaps 142 may be formed.

Second ring 120 is shown in FIGS. 2 and 4 as having two subrings 124, each having two second arcuate segments 150. Like first ring 110, the arcuate segments of each subring can be mounted opposite each other, leaving diametrically opposed gaps 152 between the segments (gap 152 between segments of right or rear subring 128 is hidden in the FIGS.). Because such gaps 152 can, for example, induce strain on adjustor 100 during operation, embodiments can stagger gaps 152 of subrings 124 so as to more evenly distribute and/or reduce strain induced by gaps 152. Where two segments are used in each subring, for example, gaps 152 can be substantially equally circumferentially spaced at ninety degree intervals. In addition, gaps 142 of first ring 110 can be taken into account so that a gap 142 or a gap 152 may occupy a unique respective circumferential position, such as at forty-five degree intervals about adjustor 110. By using more subrings, such as by using eight subrings 124 in second ring 120 as seen in FIGS. 5-7, strain may be reduced and/or more evenly distributed. While eight subrings are shown in FIGS. 5-7, it should be clear that any number of subrings can be used in first ring 110 and/or second ring 120 as may be suitable and/or desired.

Figure 8:
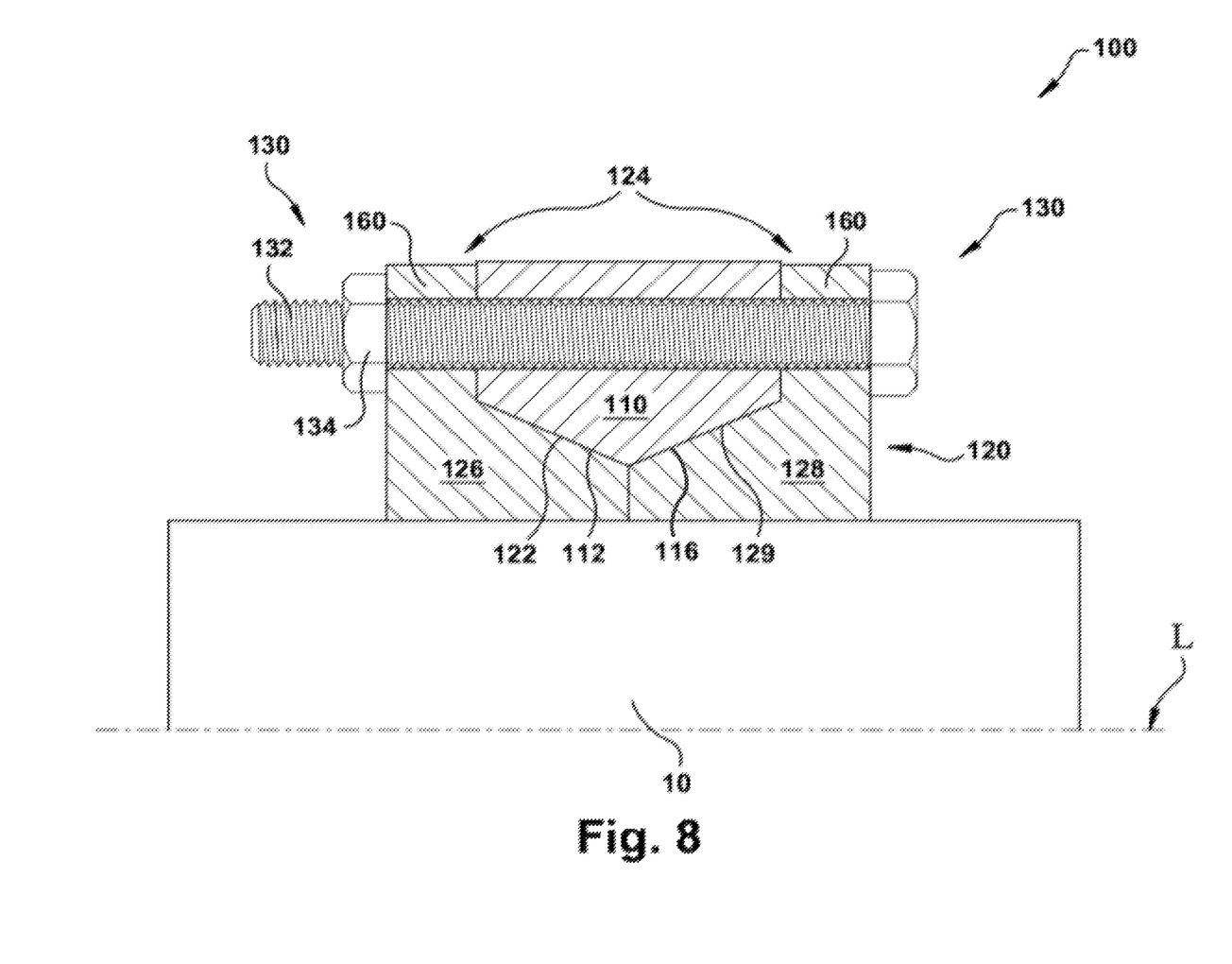
FIG. 8 shows a schematic cross sectional diagram of a torsional frequency adjustor according to other embodiments of the invention disclosed herein.

An alternate configuration of first or wedge ring 110 and second ring 120 is seen in another example of an adjustor 100 in FIG. 8. Here, subrings 124 of second or retainer ring 120 can engage the outer surface of rotor 10 with second and fourth wedge surfaces 122, 129 facing substantially radially outward, and first or wedge ring 110 can thus be mounted so that first and third wedge surfaces 112, 116, facing substantially radially inward, can selectively engage second and fourth wedge surfaces 122, 129 of subrings 124, respectively. Thus, first ring 110 can be deemed to include an outer ring, while second ring 120 can be deemed to be an inner ring in this example. In this configuration, inducer 130 can include fasteners 132, such as bolts, as well as retainer flanges or portions 160 that together can retain first ring 110 as well as subrings 124 against outward radial movement. As inducer 130 draws subrings 124, wedge action can squeeze subrings 124 against rotor 10. Adjustor 100 can then be held in place as a result of radial forces generated by interference between wedge surfaces 112, 116, 122, 129. While this configuration may be employed in embodiments, the inclusion of through holes in first or wedge ring 110 for bolts 122 may increase cost and complexity.

Figure 9:
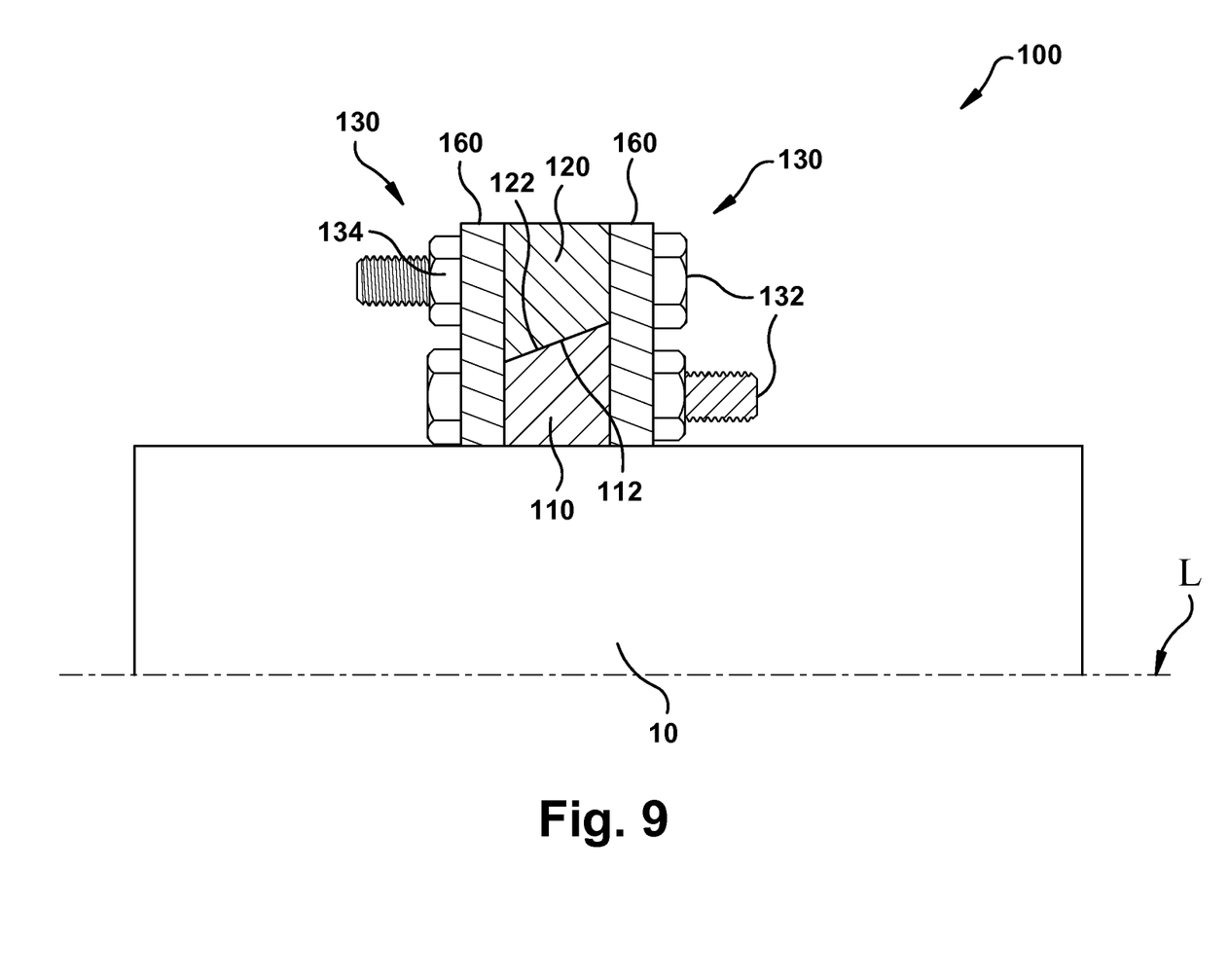
FIG. 9 shows a schematic cross sectional diagram of a torsional frequency adjustor according to additional embodiments of the invention disclosed herein.
Figure 10:
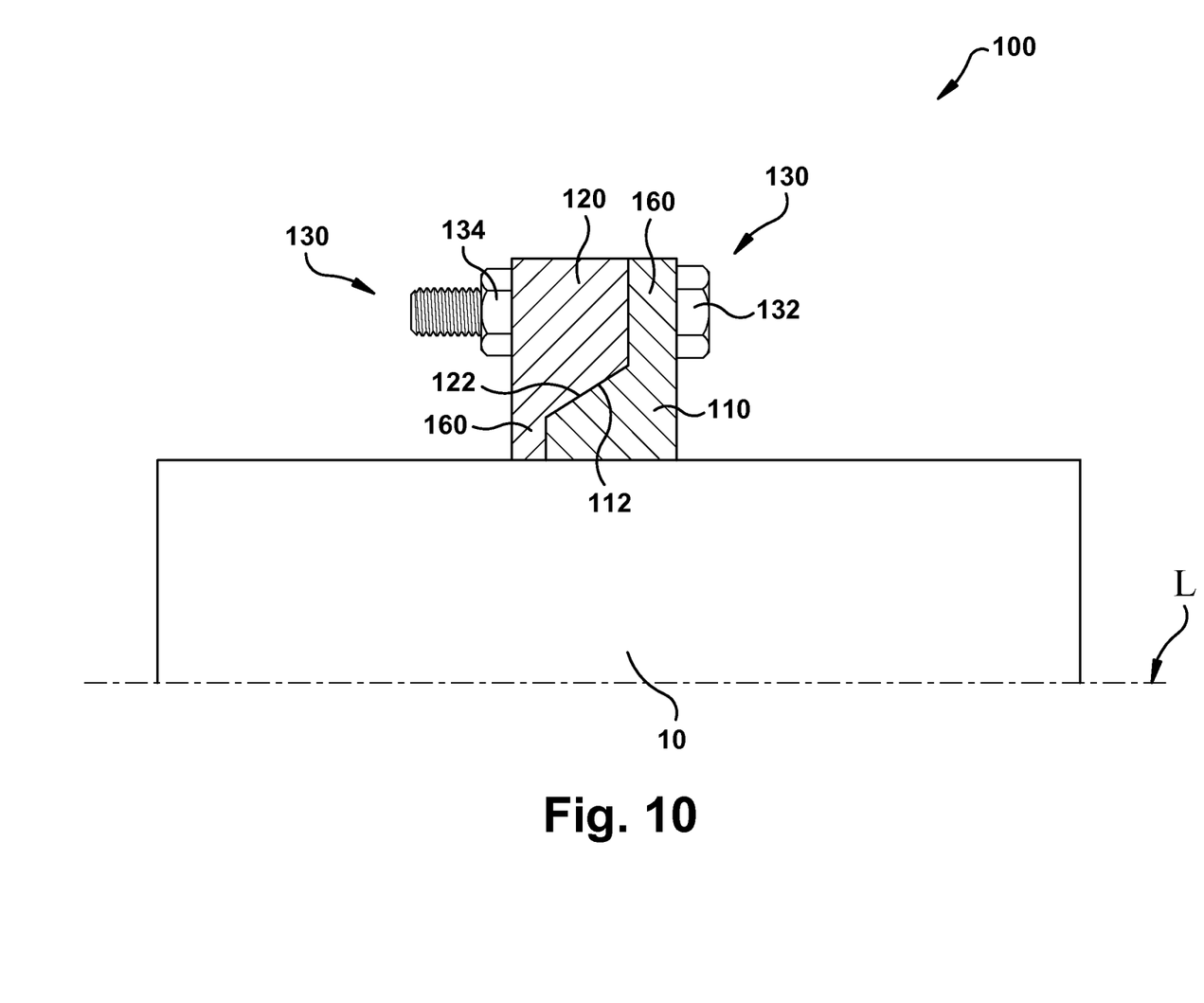
FIG. 10 shows a schematic cross sectional diagram of a torsional frequency adjustor according to further embodiments of the invention disclosed herein.

Another configuration for an adjustor 100 according to embodiments is shown in FIG. 9. As shown, first or wedge ring 110 can have one wedge surface, such as first wedge surface 112, and second ring 120 can have one corresponding wedge surface, such as second wedge surface 122. Retainer rings 160 mounted on opposite sides of first and second rings 110, 120 can draw and hold first and second rings 110, 120 together responsive to the action of fasteners 132, here shown as bolts. While bolts are shown passing through both first and second rings 110, 120, it should be clear that bolts in embodiments can pass through only the second ring 120. As the wedge surfaces are drawn together, particularly when second ring 120 is constrained against outward radial motion, such as by fasteners 132, wedge action induces an inward radial force that holds adjustor 100 on rotating body 10. Retainer rings 160 and/or bolts 132 may therefore be considered as parts of an inducer. In addition, as seen in FIG. 10, retainer rings 160 can be included as retainer portions or flanges 160 instead of as separate elements as seen in FIG. 9.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A torsional frequency adjustor for a rotating body, the torsional frequency adjuster comprising:
   a first ring having a first engagement surface parallel to an outer surface of the rotating body, the first engagement surface having a total arcuate length that is smaller than a circumference of the outer surface of the rotating body, the first ring further having a first wedge surface inclined at a first angle with respect to the first engagement surface;
   a second ring having a second wedge surface corresponding to and selectively engaging the first wedge surface, a total arcuate length of the second wedge surface being smaller than a total arcuate length of the first wedge surface at each corresponding point along a shared longitudinal axis of the first and second rings;
   an inducer that, in operation, draws the first wedge surface into engagement with a portion of the second wedge surface, thereby inducing an interference fit of the first engagement surface with the outer surface of the rotating body,
   wherein at least one of the first ring or the second ring includes a plurality of arcuate segments and at least one gap between an adjacent pair of the plurality of arcuate segments.

2. The adjustor of claim 1, wherein any gap between an adjacent pair of arcuate segments of the first ring is circumferentially spaced apart from any gap between an adjacent pair of arcuate segments of the second ring.

3. The adjustor of claim 1, wherein the inducer includes first and second retainer rings on opposite sides of the first and second rings and a plurality of fasteners circumferentially spaced about the first and second retainer rings so as to selectively draw the first and second retainer rings together, thereby selectively drawing the first and second wedge surfaces into engagement.

4. The adjustor of claim 1, wherein the first ring includes a third wedge surface inclined with respect to the first engagement surface and such that a largest-diameter end of the first wedge surface adjoins a largest-diameter end of the third wedge surface.

5. The adjustor of claim 4, further including a third ring having a fourth wedge surface corresponding to and selectively engaging the third wedge surface, a total arcuate length of the fourth wedge surface being smaller than a total arcuate length of the third wedge surface at each corresponding point along a shared longitudinal axis of the first and third rings.

6. The adjustor of claim 5, wherein the inducer includes a plurality of fasteners circumferentially spaced about and inserted through the second and third rings so as to selectively draw the second and third rings together, thereby selectively drawing the first and second wedge surfaces together, as well as drawing the third and fourth wedge surfaces together.

7. The adjustor of claim 5, wherein at least one of the second ring or the third ring includes a plurality of subrings, each subring including a plurality of arcuate segments and at least one gap between a pair of adjacent arcuate segments.

8. The adjustor of claim 7, wherein both the second ring and the third ring include a plurality of subrings and the gaps of both pluralities of subrings are circumferentially spaced so that no two gaps occupy a same circumferential position.

9. A torsional frequency adjustor for a rotating body, the torsional frequency adjustor comprising:
　a first ring having a first plurality of arcuate segments with a first inner total arcuate length that is smaller than an outer circumference of the rotating body;
　a second ring having a second plurality of arcuate segments with a second inner total arcuate length that is smaller than an outer total arcuate length of the first ring; and
　an inducer attached to at least one of the first ring or the second ring so as to induce radial inward force on the first ring, thereby forcing the first ring into engagement with the rotating body,
　wherein each plurality of arcuate segments includes a gap between an adjacent pair of arcuate segments, each gap having a unique circumferential position about the rotating body.

10. The torsional frequency adjustor of claim 9, wherein the second ring includes at least one left ring disposed over a left portion of the first ring and at least one right ring disposed over a right portion of the first ring.

11. The torsional frequency adjustor of claim 10, wherein:
　the first ring further includes a left wedge surface and a right wedge surface, a largest diameter of the left wedge surface adjoining a largest diameter of the right wedge surface;
　an inner surface of the at least one left ring corresponds to the left wedge surface;
　an inner surface of the at least one right ring corresponds to the right wedge surface; and
　the inducer selectively draws the at least one left ring toward the at least one right ring, thereby drawing the inner surface of the at least one left ring into engagement with the left wedge surface and drawing the inner surface of the at least one right ring into engagement with the right wedge surface.

12. A torsional frequency adjustor for a rotating body, the torsional frequency adjuster comprising:
　an inner ring having an inner total arcuate length smaller than an outer circumference of the rotating body and including:
　　a longitudinal center having a largest outer diameter of the inner ring;
　　a front portion of the inner ring extending from a longitudinal front edge to the longitudinal center, the longitudinal front edge having an outer diameter that is smaller than the largest outer diameter of the inner ring; and
　　a rear portion of the inner ring extending from the longitudinal center to a rear longitudinal edge, the rear longitudinal edge having an outer diameter that is smaller than the largest outer diameter of the inner ring;
　at least two front outer rings sized to engage an outer surface of the front portion of the inner ring, wherein each front outer ring includes an inner surface corresponding to at least a part of the outer surface of the front portion of the inner ring so that when the at least two front outer rings are engaging each other in a longitudinal direction, the combined inner surfaces of the at least two front outer rings form a substantially contiguous inner surface selectively engaging the outer surface of the front portion of the inner ring;
　at least two rear outer rings sized to engage an outer surface of the rear portion of the inner ring, wherein each rear outer ring includes an inner surface corresponding to at least a part of the outer surface of the rear portion of the inner ring so that when the at least two rear outer rings are engaging each other, the combined inner surfaces of the at least two rear outer rings form a substantially contiguous inner surface engaging the outer surface of the rear portion of the inner ring; and
　an inducer that draws the at least two front outer rings and the at least two rear outer rings together in the longitudinal direction, thereby drawing the inner surfaces of the outer rings into engagement with the outer surfaces of the inner ring to induce an inward radial force in the inner ring that, responsive to the inducer being mounted on the rotating body, effects an interference fit between the inner ring and the rotating body.

13. The torsional frequency adjustor of claim 12, wherein each outer ring includes at least two arcuate segments and a gap between a pair of the at least two arcuate segments, each gap having a unique circumferential position with respect to the inner ring and with respect to each other gap.

14. Torsional frequency adjustor of claim 13, wherein the at least two front outer rings include four front outer rings and the at least two rear outer rings include four rear outer rings.

15. The torsional frequency adjustor of claim 12, wherein the inducer includes a plurality of circumferentially spaced fasteners engaging at least a frontmost of the front outer rings and at least a rearmost of the rear outer rings.

* * * * *